United States Patent [19]
Brav

[11] Patent Number: 5,228,079
[45] Date of Patent: Jul. 13, 1993

[54] METHOD AND APPARATUS FOR PULSE/TONE DETECTION AND SELECTION

[75] Inventor: Alan D. Brav, Beverly, Mass.

[73] Assignee: Lifeline Systems, Inc., Watertown, Mass.

[21] Appl. No.: 728,983

[22] Filed: Jul. 12, 1991

[51] Int. Cl.⁵ .................................... H04M 1/26
[52] U.S. Cl. ........................... 379/353; 379/38
[58] Field of Search ............. 379/38, 40, 41, 39, 379/51, 49, 46, 209, 216, 69, 355, 353

[56] References Cited

U.S. PATENT DOCUMENTS 4,947,423  8/1990  Watanabe ........................... 379/353

FOREIGN PATENT DOCUMENTS 2207836  2/1989  United Kingdom ................. 379/38

Primary Examiner—James L. Dwyer
Assistant Examiner—Paul A. Fournier
Attorney, Agent, or Firm—Weingarten, Schurgin, Gagnebin & Hayes

[57] ABSTRACT

A method and apparatus for permitting a telephonic device to select the mode of dialing, pulse or tone, which is proper for the local telephone network interface to which it is connected.

11 Claims, 3 Drawing Sheets

| CALL TRY # | NUMBER DIALED | SEIZE ? | MINUTES TO NEXT CALL |
| --- | --- | --- | --- |
| 1 | PRIMARY | UNSEIZED | 1 |
| 2 | SECONDARY | UNSEIZED | 1 |
| 3 | PRIMARY | UNSEIZED | 1 |
| 4 | SECONDARY | UNSEIZED | 1.5 |
| 5 | PRIMARY | UNSEIZED | 1.5 |
| 6 | SECONDARY | SEIZED | 10 |
| 7 | PRIMARY | UNSEIZED | 1.5 |
| 8 | SECONDARY | UNSEIZED | 1.5 |
| 9 | PRIMARY | UNSEIZED | 1.5 |
| 10 | SECONDARY | UNSEIZED | 15 |
| 11 | PRIMARY | UNSEIZED | 15 |
| 12 | SECONDARY | SEIZED | 15 |

FOR CALL TRY N, N > 12
 IF N IS ODD, DIAL PRIMARY #, ELSE DIAL SECONDARY NUMBER
 IF N = 3 (MOD 3), DIAL OPPOSITE TO THE PULSE/TONE FLAG
 IF N = 6 (MOD 6), MAINTAIN TELEPHONE LINE SEIZE UNTIL NEXT ATTEMPT
 ALWAYS WAIT 15 MINUTES UNTIL NEXT ATTEMPT

*FIG. 3*

METHOD AND APPARATUS FOR PULSE/TONE DETECTION AND SELECTION

FIELD OF THE INVENTION

The invention relates to telephonic devices and more particularly to devices to detect whether a telephone network interface responds to pulse or tone dial signals and sets the mode of dialing appropriately.

BACKGROUND OF THE INVENTION

With an increasing percentage of the population comprising elderly or infirm persons living alone, the demand for a means to monitor the well-being of these individuals has increased. Although periodic visits by other individuals, such as visiting nurses or family members, provide a measure of security, and while the telephone provides a means for summoning help in an emergency, many situations immediately come to mind whereby an incapacitating emergency, such as a fall, occurs between such visits and when an individual is located some distance away from their phone.

As a result of this problem, a number of service businesses have formed which provide a monitoring service for people living alone. Typically, a person, called a subscriber, wishing to be monitored, is supplied with a home communicator. The home communicator links the person's home either by telephone or radio with a central monitoring station. Also typically, the subscriber is provided with a small personal communicator which is worn by the subscriber and which is in radio communication with the home communicator. In the event of an emergency the subscriber need only press a button on the personal communicator to cause the home communicator to notify the central monitoring station that the subscriber requests help.

When the central monitoring station receives the help call from the home communicator, the central monitoring station then proceeds to call one or more individuals, called responders, who proceed to the subscriber's home to provide assistance.

To install a home communicator in a subscriber's home, it is first necessary to set the communicator so that it will dial or place calls according to the requirements of the local telephone network interface. The network interface is generally preconfigured according to the type of service a telephone subscriber has selected and paid for. The local telephone network interface will accept, depending upon its preconfiguration, only pulses or only tones generated by the telephonic unit during dialing.

Telephonic devices, in order to be used both with network interfaces which accept tone dialing and those which accept pulse dialing, typically include a user setable switch which selects whether the telephonic unit will dial numbers by generating tones or pulses. A telephonic device which is set improperly, i.e., either generating pulses when the network interface accepts only tones or vice versa, will be unable to place calls over the telephone network. The consequences of an improper dialer setting may be severe in the case of a home communicator which is to be used to request help in an emergency.

The present invention relates to an apparatus and method for permitting a telephonic device to select pulse or tone generation itself, as appropriate, and thereby avoid the problems which may arise from an improper selection.

SUMMARY OF THE INVENTION

The invention relates to a method and apparatus for permitting a telephonic device to select the mode of dialing, pulse or tone, which is proper for the local telephone network interface to which it is connected. In one embodiment, the telephonic device includes a pulse generator, a tone generator, a digital selector for selecting pulse or tone generation, a microprocessor and memory. The telephonic device is initially preset to dial numbers using the tone generator. Upon its first use, the telephonic device attempts to call a central monitoring station using tone dialing. If the dialing fails to establish contact with the central monitoring station after a second attempt using tones, the microprocessor detects the second failure and causes the telephonic device to use pulse dialing, by means of the digital selector. Each time there are two consecutive failures in dialing, the microprocessor causes the previously non-selected mode of dialing to be selected. The mode which is first successful at establishing communications with the central monitoring station is stored in memory and used first in the next subsequent dialing attempt.

BRIEF DESCRIPTION OF THE DRAWINGS

Other features and benefits of the invention can be more clearly understood with reference to the specification and the accompanying drawings in which:

FIG. 3 is a table of line seize and delay as a function of the dial attempt.

DESCRIPTION OF THE PREFERRED EMBODIMENT

Figure 1:
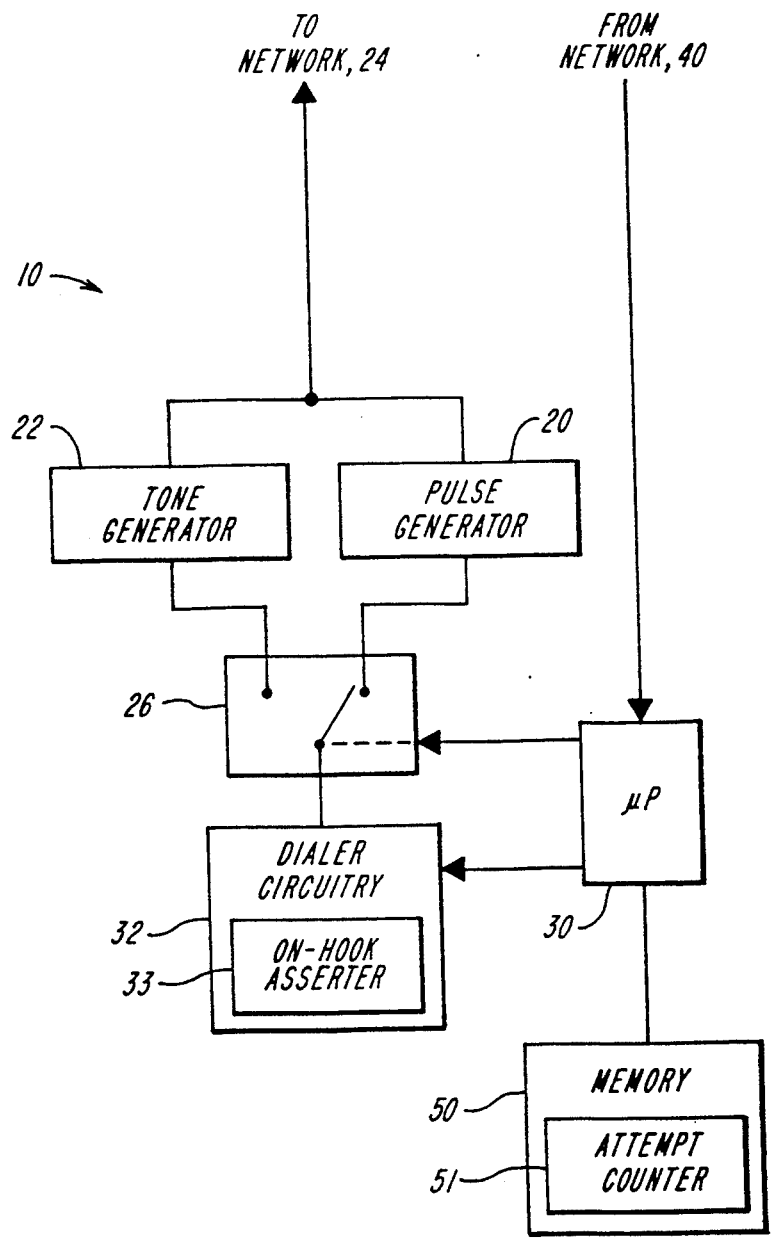
FIG. 1 is a block diagram of an embodiment of the invention.

Referring to FIG. 1, an embodiment of the invention 10 which includes a pulse generator 20 and a tone generator 22 connected to the telephone network 24. A microprocessor 30 controls the operation of a digital selector 26 and dialer circuitry 32. To place a call, the microprocessor 30 instructs the dialer circuitry 32, by means of the digital selector 26 to cause either the pulse generator 20 or tone generator 22 to produce the series of pulses or tones, respectively, which corresponds to the number being dialed.

In the embodiment herein disclosed, the number being dialed corresponds to a central response station number. The central response station, upon receiving a call for help, responds with a handshake or acknowledgment tone to indicate to the calling unit that the call has been received. In the embodiment shown, the handshake tone is a 2300 Hz tone which is asserted for at least 500 ms within 35 seconds of the beginning of the dialing by the calling unit.

Once the acknowledgment has been received, the calling unit transmits alarm information and then awaits the reception of a termination tone. The termination tone in this embodiment is a 2300 Hz tone asserted for at least 200 ms within 2 seconds of the data transmission by the calling unit. If the termination tone is not received with these specified parameters, the alarm information is transmitted again and the calling unit waits for the termination tone again. This sequence is repeated up to 5 times.

The lack of a handshake tone within the specified time duration or the lack of a termination tone after 5 alarm information transmission attempts is classified as a call failure. If there is a call failure, the microprocessor 30 causes the number to be redialed, using the same mode as just previously used. If this second attempt is also unsuccessful, the microprocessor 30 switches modes by means of the digital selector 26 and redials the number. The microprocessor 30 is programmed to delay the redialing of a number for variable amounts of time. The delay is determined by how many attempts have been previously made.

In addition, the apparatus is designed to assert an "on-hook" condition by an on-hook asserter 33 after a specified number of dialing attempts. The assertion of an on-hook condition seizes the line by signaling the network to permit the line to be active even if another extension phone at the location is actually off-hook. In this way, an extension phone in an off-hook condition will not prevent an emergency alarm from being transmitted by the calling unit.

If the call has been completed successfully, the microprocessor 30 causes the mode selected, which was successful at establishing communications, to be stored in memory 50. The next subsequent call made by the telephonic device 10, places the call using the mode stored in memory 50.

Figure 2:
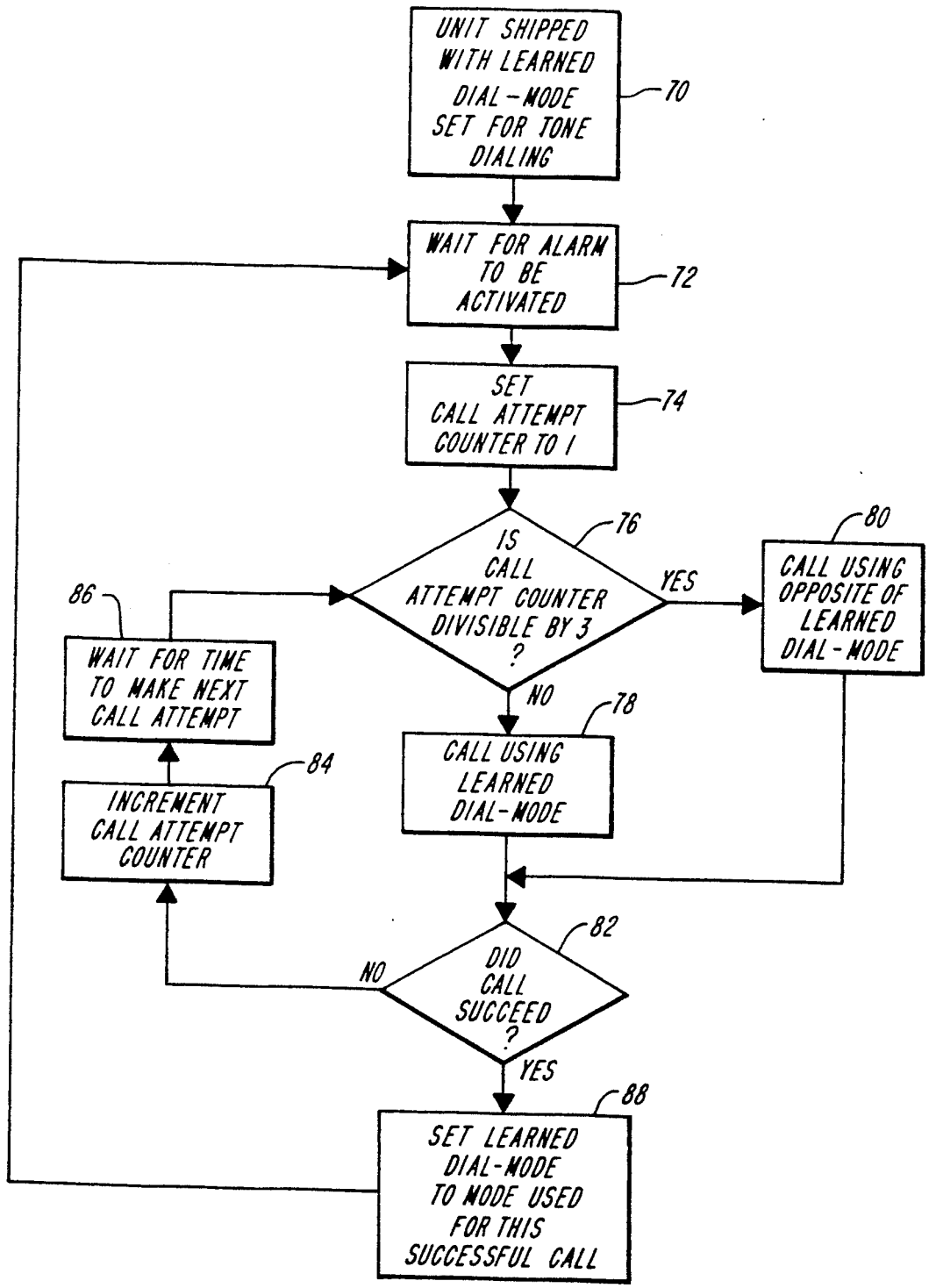
FIG. 2 is a flow chart describing an embodiment of the operation of the embodiment of the invention is shown comprising a telephone device shown in FIG. 1.

Considering the operation in more detail and referring to FIG. 2, in which the steps of the operation are designated by numerals in parentheses, the telephonic device 10, as shipped to the subscriber, is configured to dial using tones (70), since tone dialing may be permitted with a pulse dial telephone network interface. Once the telephonic unit is connected to the telephone network interface, the telephonic unit awaits a help request (72) before attempting to dial a number.

When the subscriber activates the unit to request help, the telephonic device first sets a call-attempt-counter 51 to one (74). If the number in the call-attempt-counter is not divisible by three (76), the central station is dialed using the present dialing mode.

If the call does not complete (82), the call-attempt-counter is incremented (84). Referring also to FIG. 3, once the call-attempt counter has been incremented (84) the system waits a predetermined amount of time (86) before attempting to dial again. The amount of time is determined by the number of the call attempt. If the number of the call attempt is less than twelve, the amount of delay is as is indicated in FIG. 3. For more than twelve call attempts, the delay, in this embodiment, is 15 minutes.

When attempting a redial, if the value in the call-attempt-counter is not divisible by three (76) the call is simply reattempted. However, if the value in the call-attempt-number is divisible by three the call is reattempted after resetting (80) the mode of dialing opposite to the mode just previously used, i.e., if the mode of dialing was pulse mode it is changed to tone mode and vice versa. It is also contemplated that on alternate call attempts, for example odd numbered call attempts, a second phone number may be dialed, rather than redialing the same phone number repeatedly. It is also contemplated that on every call attempt which is a multiple of six, the "on-hook" signal will be asserted to seize the telephone line.

Once the call completes successfully, the mode used for the successful call is stored (88) in memory and used on the next request for help. The system then awaits another alarm condition.

These and other examples of the concept of the invention illustrated above are intended by way of example and the actual scope of the invention is to be determined solely from the following claims.

What is claimed is:

1. A method for setting a mode of dialing in a telephonic device to correspond to that of a telephone network interface to which the telephonic device is in communication, the steps comprising:
   attempting to place a call by dialing a telephone number using a first mode of dialing;
   determining if the call has completed successfully;
   changing the mode of dialing from said first mode of dialing to a second mode of dialing if the call has not completed successfully and redialing;
   storing the mode of dialing by which the call was completed successfully.

2. The method of claim 1 wherein prior to said changing of the mode of dialing following the unsuccessful call, the mode of dialing currently being used is reattempted once.

3. The method of claim 1 wherein the first mode of dialing is tone dialing.

4. The method of claim 1 wherein on alternate dialing attempts, a second telephone number is dialed.

5. The method of claim 1 further including the step of asserting an on-hook signal prior to redialing.

6. The method of claim 1 further including the step of asserting an on-hook signal after a predetermined number of dialing attempts.

7. A telephonic device comprising:
   a pulse generator connected to a telephone network;
   a tone generator connected to said telephone network;
   a selector device for selecting one of either said pulse generator or said tone generator for producing a dialing mode;
   a dialer circuit for using one of either said pulse generator or said tone generator to dial a number; and
   a controller in communication with said selector for causing said selector to select said one of either said tone generator or said pulse generator for producing said dialing mode, said controller in communication with said dialer circuit to cause said dialer circuit to use one of either said pulse generator or said tone generator to dial a number;
   said controller also in communication with said telephone network and causing said dialing mode to be selected by said selector in response as to whether said dialing mode used successfully completed a previous call.

8. The telephonic device of claim 7 further comprising a call-attempt-counter for determining how many attempts have been made using the mode of dialing currently being used.

9. The telephonic device of claim 8 further comprising an "on-hook" signal asserter for generating an on-hook signal after a predetermined number of attempts.

10. The telephonic device of claim 7 further comprising a memory for storing an indication of the dialing mode, said controller causing said memory to store an indication of the dialing mode which successfully completed said previous call.

11. The telephone device of claim 7 wherein said controller is a microprocessor.

* * * * *